US012352232B2

(12) United States Patent
Ding et al.

(10) Patent No.: US 12,352,232 B2
(45) Date of Patent: Jul. 8, 2025

(54) POWER TUNNEL

(71) Applicant: POWER8 TECH INC., Los Gatos, CA (US)

(72) Inventors: Lien Chun Ding, Taoyuan (TW); Chih Cheng Tai, Campbell, CA (US)

(73) Assignee: Power8 Tech. Inc., Los Gatos, CA (US)

( * ) Notice: Subject to any disclaimer, the term of this patent is extended or adjusted under 35 U.S.C. 154(b) by 0 days.

(21) Appl. No.: 18/760,008

(22) Filed: Jun. 30, 2024

(65) Prior Publication Data

US 2024/0352914 A1 Oct. 24, 2024

Related U.S. Application Data

(63) Continuation of application No. 18/205,638, filed on Jun. 5, 2023, now Pat. No. 12,180,919, which is a continuation-in-part of application No. 17/777,516, filed as application No. PCT/US2022/029374 on May 16, 2022, now Pat. No. 11,870,253.

(60) Provisional application No. 63/349,284, filed on Jun. 6, 2022.

(30) Foreign Application Priority Data

Dec. 3, 2021 (CN) ......................... 202111466565.5

(51) Int. Cl.
*F03B 13/06* (2006.01)

(52) U.S. Cl.
CPC .................................... *F03B 13/06* (2013.01)

(58) Field of Classification Search
CPC .......... F03B 13/06; Y02E 70/30; Y02E 10/20; H02J 15/003; H02J 15/006; H02J 2300/20
See application file for complete search history.

(56) References Cited

U.S. PATENT DOCUMENTS

| | | | | |
|---|---|---|---|---|
| 2,652,690 | A * | 9/1953 | Labriola | F03B 13/06 60/398 |
| 3,991,574 | A | 11/1976 | Frazier | |
| 4,206,608 | A * | 6/1980 | Bell | F03D 9/17 290/55 |
| 4,220,006 | A | 9/1980 | Kindt | |
| 4,367,786 | A | 1/1983 | Hafner et al. | |
| 4,525,631 | A | 6/1985 | Allison | |
| 6,109,358 | A | 8/2000 | McPhee | |
| 6,718,761 | B2 * | 4/2004 | Merswolke | F03D 9/008 60/398 |

(Continued)

FOREIGN PATENT DOCUMENTS

| | | | |
|---|---|---|---|
| CN | 102966387 | A | 3/2013 |
| CN | 103925111 | A | 7/2014 |

(Continued)

OTHER PUBLICATIONS

TIPO Search Report in Taiwan Application No. 112118947.

(Continued)

*Primary Examiner* — Thomas E Lazo
(74) *Attorney, Agent, or Firm* — Haverstock & Owens, A Law Corporation

(57) ABSTRACT

A power tunnel comprises a tube body, an inlet, and an outlet. The tube body provides space to accommodate gases, liquids, people, vehicles, etc. The power tunnel can be used for energy storage, power generation, air-raid shelter, or other purposes.

28 Claims, 6 Drawing Sheets

(56) References Cited

U.S. PATENT DOCUMENTS

| | | | | |
|---|---|---|---|---|
| 7,168,252 | B1 | 1/2007 | Price | |
| 7,281,371 | B1 * | 10/2007 | Heidenreich | F03B 13/06 60/398 |
| 7,364,810 | B2 | 4/2008 | Sridhar et al. | |
| 7,579,700 | B1 * | 8/2009 | Meller | F03B 17/005 290/43 |
| 7,663,255 | B2 * | 2/2010 | Kim | F02C 6/18 290/1 R |
| 7,743,609 | B1 | 6/2010 | Brostmeyer | |
| 7,878,280 | B2 | 2/2011 | Sridhar et al. | |
| 8,037,678 | B2 | 10/2011 | McBride et al. | |
| 8,127,542 | B1 * | 3/2012 | Dolcimascolo | F03B 17/005 60/398 |
| 8,240,956 | B2 | 8/2012 | Lewis | |
| 8,723,347 | B2 | 5/2014 | Crane et al. | |
| 8,739,533 | B2 | 6/2014 | Yogev et al. | |
| 8,806,866 | B2 | 8/2014 | McBride et al. | |
| 8,823,195 | B2 * | 9/2014 | Legacy | F03B 13/08 290/43 |
| 9,059,605 | B2 | 6/2015 | Murray et al. | |
| 9,261,068 | B2 * | 2/2016 | Barakat | F03B 13/00 |
| 9,410,559 | B2 | 8/2016 | VanWalleghem et al. | |
| 9,422,948 | B2 * | 8/2016 | Kim | F15B 15/00 |
| 9,444,378 | B2 * | 9/2016 | Fong | F17C 13/04 |
| 9,562,521 | B2 | 2/2017 | Yogev | |
| 9,797,366 | B2 | 10/2017 | Schmidt-Boecking et al. | |
| 10,203,735 | B2 | 2/2019 | Gross et al. | |
| 10,205,323 | B2 * | 2/2019 | Lowell | H02J 3/381 |
| 10,208,737 | B1 | 2/2019 | Freeman | |
| 10,344,741 | B2 * | 7/2019 | Sant | F03D 13/25 |
| 10,415,469 | B2 * | 9/2019 | Blount | F02C 6/06 |
| 10,655,505 | B2 | 5/2020 | Matskuma et al. | |
| 10,707,802 | B1 * | 7/2020 | Materna | H02S 20/32 |
| 10,823,132 | B2 | 11/2020 | Mesinger et al. | |
| 10,836,579 | B2 | 11/2020 | Yogev | |
| 10,837,429 | B2 | 11/2020 | Pedretti | |
| 10,859,207 | B2 | 12/2020 | Lewis et al. | |
| 11,274,792 | B2 | 3/2022 | Stradiotto | |
| 11,387,707 | B2 | 7/2022 | Yogev | |
| 11,404,935 | B2 | 8/2022 | Yogev | |
| 2002/0144503 | A1 | 10/2002 | Merswolke | |
| 2005/0155347 | A1 | 7/2005 | Lewellin | |
| 2005/0198959 | A1 | 9/2005 | Schubert | |
| 2005/0279085 | A1 * | 12/2005 | Moore | F03B 13/185 60/398 |
| 2007/0289622 | A1 | 12/2007 | Hecht | |
| 2008/0136186 | A1 | 6/2008 | Gogoana et al. | |
| 2008/0211230 | A1 | 9/2008 | Gurin | |
| 2009/0152871 | A1 * | 6/2009 | Ching | F03G 7/00 415/916 |
| 2010/0089063 | A1 | 4/2010 | McBride | |
| 2010/0096858 | A1 | 4/2010 | Riley | |
| 2010/0192568 | A1 | 8/2010 | Peacock | |
| 2010/0205960 | A1 | 8/2010 | McBride | |
| 2010/0252028 | A1 | 10/2010 | Mierisch et al. | |
| 2010/0270801 | A1 | 10/2010 | Liu | |
| 2010/0326062 | A1 | 12/2010 | Fong et al. | |
| 2011/0030361 | A1 * | 2/2011 | Gopalswamy | F16D 31/02 60/398 |
| 2011/0041490 | A1 | 2/2011 | Gogoana et al. | |
| 2011/0120673 | A1 | 5/2011 | Xiang et al. | |
| 2011/0259007 | A1 | 10/2011 | Aoyama et al. | |
| 2011/0266804 | A1 * | 11/2011 | Dolcimascolo | F03B 17/04 415/916 |
| 2011/0296822 | A1 | 12/2011 | Bollinger | |
| 2012/0305411 | A1 | 12/2012 | Elazari-Volcani | |
| 2013/0134612 | A1 | 5/2013 | Lewis et al. | |
| 2013/0214537 | A1 | 8/2013 | Hashimoto | |
| 2013/0219892 | A1 | 8/2013 | Havel | |
| 2013/0220310 | A1 | 8/2013 | Gregory et al. | |
| 2014/0026547 | A1 | 1/2014 | Kim et al. | |
| 2015/0000248 | A1 | 1/2015 | del Omo | |
| 2015/0211551 | A1 | 7/2015 | VanWelleghem et al. | |
| 2016/0178129 | A1 | 6/2016 | Chen et al. | |
| 2016/0201658 | A1 | 7/2016 | Arapkoules | |
| 2016/0348637 | A1 | 12/2016 | Bächli | |
| 2017/0264164 | A1 | 9/2017 | Lenk et al. | |
| 2018/0306066 | A1 | 10/2018 | Yesil | |
| 2018/0320679 | A1 | 11/2018 | Enis et al. | |
| 2019/0003384 | A1 | 1/2019 | Bannari | |
| 2019/0052094 | A1 | 2/2019 | Pmsvvsv et al. | |
| 2019/0064757 | A1 | 2/2019 | Ramamurthy | |
| 2019/0221697 | A1 | 7/2019 | Cho | |
| 2020/0263830 | A1 | 8/2020 | Stradiotto et al. | |
| 2021/0071632 | A1 | 3/2021 | Gudesen | |
| 2021/0075296 | A1 | 3/2021 | Yogev | |
| 2021/0206574 | A1 | 7/2021 | Yogev | |
| 2021/0221652 | A1 | 7/2021 | Pedretti et al. | |
| 2021/0351615 | A1 | 11/2021 | Yogev | |
| 2021/0388810 | A1 | 12/2021 | Young et al. | |
| 2021/0404446 | A1 | 12/2021 | Pedretti et al. | |
| 2022/0090585 | A1 | 3/2022 | Lewis et al. | |
| 2022/0243701 | A1 | 8/2022 | Pedretti et al. | |

FOREIGN PATENT DOCUMENTS

| | | | |
|---|---|---|---|
| CN | 103216426 | B | 2/2016 |
| CN | 106091403 | A | 11/2016 |
| CN | 105043147 | B | 1/2017 |
| CN | 102797613 | B | 3/2017 |
| CN | 107002641 | A | 8/2017 |
| CN | 104675680 | B | 12/2017 |
| CN | 106677848 | B | 3/2018 |
| CN | 106499612 | B | 6/2018 |
| CN | 109826741 | A * | 5/2019 |
| CN | 108571415 | B | 12/2019 |
| CN | 111636991 | A | 9/2020 |
| CN | 112360584 | A | 2/2021 |
| CN | 112459980 | A | 3/2021 |
| CN | 114198242 | A | 3/2022 |
| CN | 114934869 | B | 8/2022 |
| JP | 0617555 | A | 1/1994 |
| JP | 2015145674 | A | 8/2015 |
| TW | M375775 | U | 3/2010 |
| TW | 201241308 | A | 10/2012 |
| TW | M440345 | U | 11/2012 |
| TW | M446825 | U | 2/2013 |
| TW | 202108950 | A | 3/2021 |
| WO | 2011024928 | A1 | 3/2011 |
| WO | 2011076926 | A2 | 6/2011 |
| WO | 2015159278 | A1 | 10/2015 |
| WO | WO2021078568 | A1 | 4/2021 |

OTHER PUBLICATIONS

TIPO Search Report in Taiwan Application No. 112120898.
TIPO Search Report in Taiwan Application No. 112118938.
TIPO Search Report in Taiwan Application No. 112128677.
Notification Concerning Transmittal of International Preliminary Report on Patentability dated Feb. 13, 2025 issued in PCT Patent Application No. PCT/US2023/029077.
Notification Concerning Transmittal of International Preliminary Report on Patentability dated Dec. 5, 2024 issued in PCT Patent Application No. PCT/US2023/023060.
Notification Concerning Transmittal of International Preliminary Report on Patentability dated Dec. 5, 2024 issued in PCT Patent Application No. PCT/US2023/023063.
International Search Report in International Application No. PCT/US2023/24400, mailed on Sep. 5, 2023, 11 pages.
International Preliminary Report dated Jun. 13, 2024, in International Application No. PCT/US2022/029374.
International Search Report mailed Apr. 1, 2024, in International Application No. PCT/US2023/81234, 15 pages.
Notification Concerning Transmittal of International Preliminary Report on Patentability dated Dec. 19, 2024 issued in PCT Patent Application No. PCT/US2023/024400.

* cited by examiner

POWER TUNNEL

CROSS-REFERENCE TO RELATED APPLICATIONS

This application is a continuation application of the co-pending U.S. patent application Ser. No. 18/205,638, filed on Jun. 5, 2023, and entitled "POWER TUNNEL" which is a continuation-in-part (CIP) of the U.S. patent application Ser. No. 17/777,516, filed on May 17, 2022, and entitled "ENERGY STORAGE SYSTEMS AND METHODS USING HETEROGENEOUS PRESSURE MEDIA AND INTERACTIVE," which is a National Stage of PCT/US2022/029374, filed on May 16, 2022, and entitled "ENERGY STORAGE SYSTEMS AND METHODS USING HETEROGENEOUS PRESSURE MEDIA AND INTERACTIVE ACTUATION MODULE," which claims a priority to CN202111466565.5, filed on Dec. 3, 2021, and entitled "ENERGY STORAGE SYSTEMS AND METHODS USING HETEROGENEOUS PRESSURE MEDIA AND INTERACTIVE ACTUATION MODULE"

Further, this application claims priority to the U.S. Provisional Application No. 63/349,284, filed on Jun. 6, 2022, and entitled "POWER TUNNEL."

All of the above are incorporated herein by reference for all purposes.

FIELD OF THE INVENTION

The present invention relates to the field of energy, and more particularly, to a power tunnel.

BACKGROUND OF THE INVENTION

In order to escape from the threat of war (or nuclear war), governments and private entities around the world have set up shelters to protect people, vehicles, aircraft, supplies, etc., from danger. A shelter can be, for example, an air-raid shelter, cave, tunnel, above-ground pipeline, underground pipeline, water pipeline, oil pipeline, subway passage, cellar, basement, railroad arch, and the like. Alternatively, in some civil engineering projects or designs, to ensure that a system can maintain stable operation after the construction work is completed in the future, a backup system is usually designed in addition to the main system. In the case of tunneling projects, for example, in addition to the main tunnel, a backup tunnel may be built in case the main tunnel cannot be used (e.g., due to landslides, accidents, etc.) or is not sufficient; however, backup tunnels are usually closed and unused in normal times.

SUMMARY OF THE INVENTION

In some embodiments, the present invention uses a liquid (such as water) to pressurize the gas in a space, for example a pipe or a tunnel, so as to change the volume, density or molecular arrangement of the gas (e.g., air), thereby causing the pressurization of the gas (e.g., space replace of air by water). Moreover, the expansion, depressurization or release of the gas can in turn push the liquid, so that the liquid can drive another device, such as a power generator (e.g., a water turbine, a gas turbine), to generate electricity. In another embodiment, the liquid from the power generator can be collected/recycled back to pressurize the gas again, and by repeating this cycle, green energy without carbon emissions can be generated. Furthermore, the purpose of energy storage can be achieved by adjusting the time of gas depressurization.

In this embodiment, the aforesaid space is illustrated by a tunnel as an example. In the present invention, the tunnel is also called a power tunnel because it can store and generate green energy.

In addition to being used to generate green energy, power tunnels can be open in times of war or natural disasters to accommodate people, supplies, vehicles, aircraft, weapons, etc.

DETAILED DESCRIPTION OF THE PREFERRED EMBODIMENTS

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

The power tunnel is used as an example to illustrate the operation of the power storage system and the power supply system of the present invention.

Figure 1A:
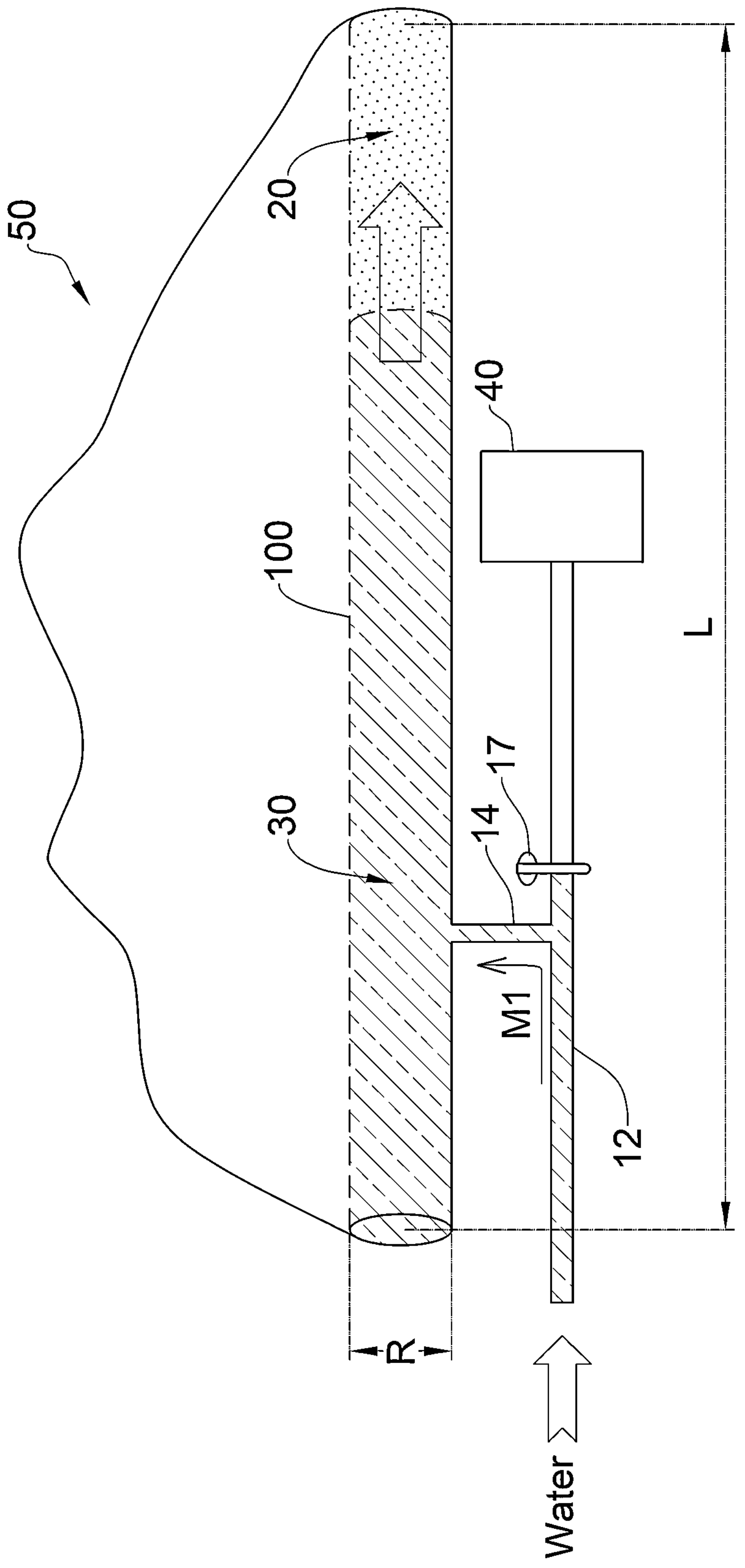
FIG. 1A is a schematic view illustrating an energy storage mode of the power tunnel according to some embodiments of the present invention.

FIG. 1A is a schematic view illustrating an energy storage mode of the power tunnel according to some embodiments of the present invention. FIG. 1A shows a power tunnel 100 with a diameter of R and a length of L dug in the mountain 50, wherein R ranges from about 2 meters to 10 meters and L ranges from about 10 meters to 120 meters, such as 10 meters, 20 meters, 50 meters, 80 meters, and 100 meters. It should be noted that the above values of R and L are only exemplary, and they may be any values in practice. In FIG. 1A, a portion of the space in the power tunnel 100 contains the gas 20 (e.g., air) and there is no path for the gas 20 to escape in the power tunnel 100. In some embodiments, the gas in the power tunnel 100 has a lower threshold pressure or is pre-pressurized gas, such as 2 atm, 5 atm, 10 atm, 20 atm, 40 atm, or 60 atm. In some embodiments, the lower threshold pressure is always maintained, thus; the gas pressure in the power tunnel 100 is equal to or higher than the lower threshold pressure before, during, and after the water storage or release. The pressure of the above-mentioned lower threshold pressure or the above-mentioned pre-pressurized gas can be determined by the water flow rate and water flow amount driven by the gas pressure, so that the efficiency of the hydrogenerator is optimized. For example, the lower threshold pressure of the gas is determined by the water flow rate and/or amount needed to drive the hydrogenerator efficiently based on the machine specification of the hydrogenerator.

When the water 30 enters the power tunnel 100 in the flow direction M1 through the inlet 14, the water 30 begins to fill the space (an example of a sheltering space) inside the power tunnel 100. As more and more water 30 fills the space inside the power tunnel 100, the gas 20 (e.g., air) that was originally in the power tunnel 100 is gradually pushed, causing the gas 20 to be pressurized; for example, the greater the amount of water 30 entering the power tunnel 100 is, the more the gas 20 is pressurized. In some embodiments, the gas pressure is increased to 10-70 atm from 2 atm. In one embodiment, if the water 30 does not flow out of the inlet pipe 12, the applied force for pressurizing the gas 20 becomes a force to store energy. The flow direction of the water 30 can be controlled by opening or closing one or more valves. For example, the valve 17 is closed to allow the water 30 to enter the power tunnel 100 in the flow direction M1.

In some embodiments, the gas 20 in the power tunnel 100 can be pre-pressurized, such as 40 atm before pumping the water 30 into the power tunnel 100.

Figure 1B:
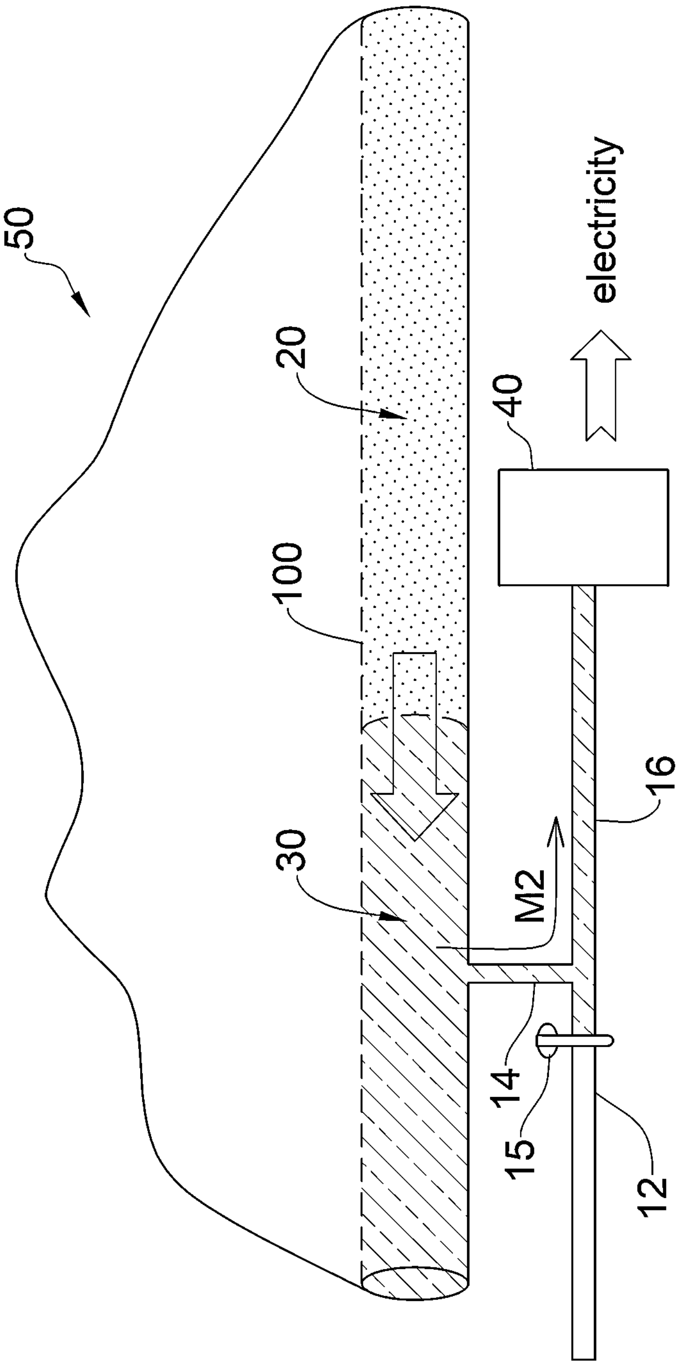
FIG. 1B is a schematic view illustrating an electricity generating mode of the power tunnel according to some embodiments of the present invention.

Please refer to FIG. 1B. When the water 30 in the power tunnel 100 has no other leakage path except the inlet 14 (or outlet 14) and the inlet pipe 12 is closed by closing the valve 15, the water is forced to flow in the direction of the hydrogenerator 40 (e.g., water turbine) (used as an example of the power generator), the pressurized gas in the power tunnel 100 begins to release pressure, and the acting force of the gas decompression causes the water 30 to rush towards the water turbine 40 through the outlet pipe 16. When the water 30 reaches and acts on the hydrogenerator 40, the hydrogenerator 40 can generate electricity.

In the above-described process, the amount of energy stored and the amount of power generated can be determined by adjusting the flow direction, flow rate and volume of water.

Figure 1C:
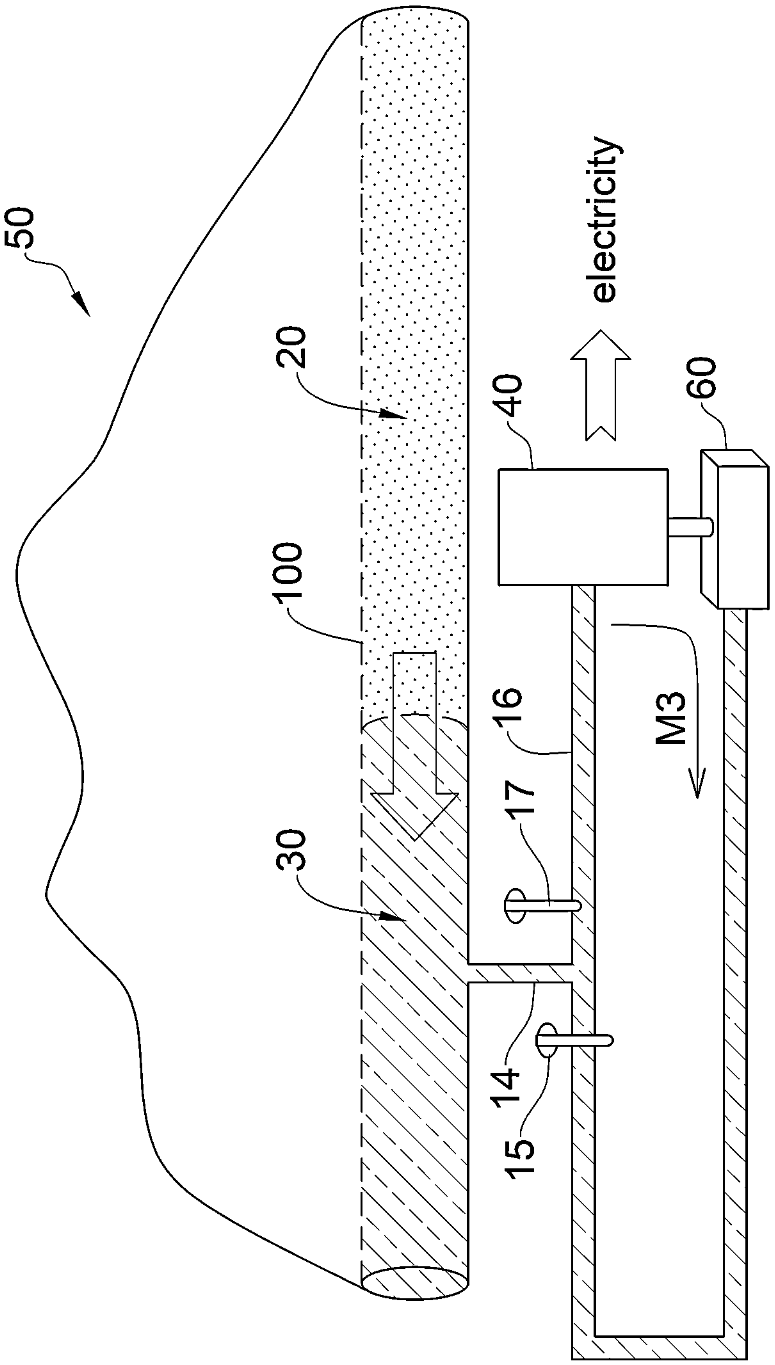
FIG. 1C is a schematic view illustrating a water recycling mode of the power tunnel according to some embodiments of the present invention.

FIG. 1C is a schematic view illustrating a water recycling mode of the power tunnel according to some embodiments of the present invention. In these embodiments, the water 30 passing through the hydrogenerator 40 is collected in a tank/sink 60, and then returns to the inlet 14 in the flow direction M3 through the pipe, so that the water 30 can be reused again to create a circular energy storage and power generation system.

Figure 1D:
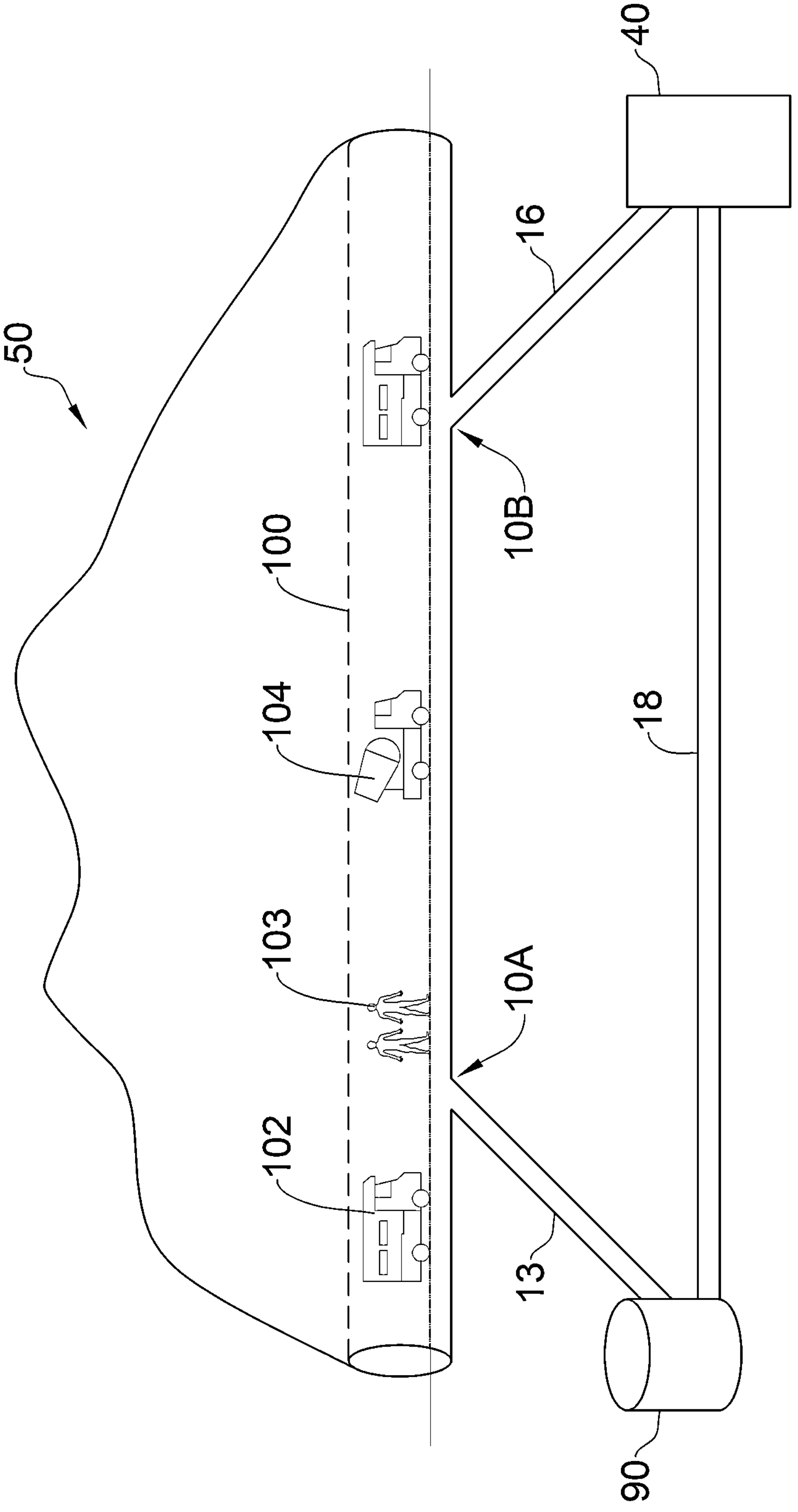
FIG. 1D is a schematic view illustrating a shelter use of the power tunnel according to some embodiments of the present invention.

FIG. 1D is a schematic view illustrating a shelter use of the power tunnel 100 according to some embodiments of the present invention. In these embodiments, the power tunnel 100 used as a power supply system comprises a water source 90 for supplying a first amount water; a sheltering space for receiving the first amount water and for discharging a second amount of water; a hydrogenerator 40 (used as an example of a power generator) for receiving the second amount of water to generate electricity; a water inlet 10A; a water outlet 10B; and water pipes 13, 16, and 18. The shelter having the sheltering space can be the tunnel excavated in the mountain 50 as described above. It should be understood that the flow direction of water in the system can be controlled by one or more valves. For example, when water is injected into the power tunnel 100, the water pipe 16 can be closed through a valve (not shown) to prevent water from flowing out of the water outlet 10*b*. The water can be used as water storage for the human and personnel's consumption.

When a large amount of water enters the power tunnel 100 and there is no leakage path in the power tunnel 100, the gas (e.g., air) in the power tunnel 100 will be compressed to store energy (a pressurized energy), which is an energy storage mode. In the electricity generation mode, the pressurized energy is released, forcing the water to flow towards the hydrogenerator 40 to generate electricity. The amount of water received by the hydrogenerator 40 depends on the amount of electricity required and the amount of tunnel space required.

The water used to drive the hydrogenerator 40 can be recycled to the sink 60 shown in FIG. 1C or diverted back to the water source 90 for reuse.

As shown in FIG. 1D, when there is a war or a natural disaster, water can be removed or discharged from the power tunnel 100, so that the space inside the power tunnel 100 can be used as an air-raid shelter, and people 103, vehicles (e.g., cars, aircraft, ambulances 102, missile vehicles 104), supplies, etc. can be protected by the power tunnel 100 without being hurt or damaged.

In another embodiment, the space inside the power tunnel 100 is used as aircraft runway.

In some embodiments, the space inside the power tunnel 100 is used for missile storage and launch.

The sheltering space can be used to store water and pressure. The shelter for providing sheltering space can be an air-raid shelter, mine (e.g. coal mine), cave (e.g. natural cave), tunnel (e.g., existing tunnel), above-ground pipeline, underground pipeline, water pipeline, oil pipeline, subway passage, cellar, basement, railroad arch, or the like.

The water source 90 can be a river or a lake. The water source 90 can also be a tank with water stored in it. As described above, the water used to drive the hydrogenerator 40 can be recycled to the sink 60 shown in FIG. 1C or guided to the water source 90 for reuse. The water recycled in the sink 60 can be for human use during war.

This is a new way of power storage and generation without generating substantial heat. It provides advantages that thermal radar (Infrared) won't detect the existence of a power generator.

Figure 2:
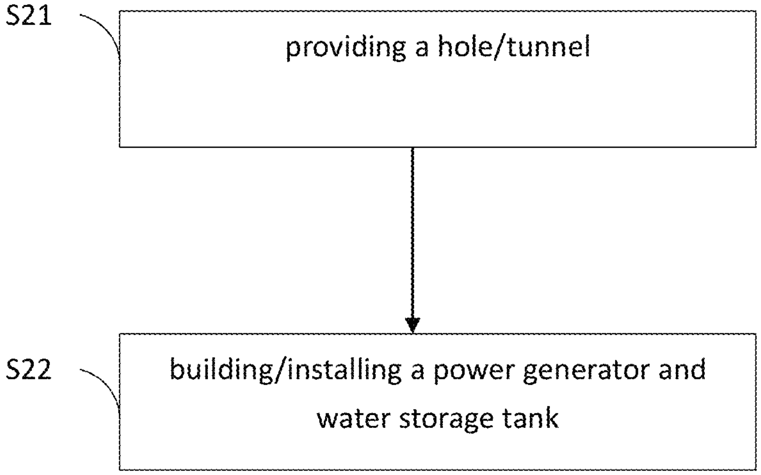
FIG. 2 is a flow chart schematically illustrating the method of manufacturing the power tunnels in accordance with some embodiments.

FIG. 2 is a flow chart schematically illustrating the method of manufacturing the power tunnels in accordance with some embodiments. In FIG. 2, the method starts at Step S21. At Step S21, a hole/tunnel is provided. The hole/tunnel may be existing or may be drilled/excavated at a site selected by a user.

At Step S22, a power generator and water storage tank are built/installed. In some embodiments, the power generator is connected to the hole/tunnel and the water storage tank. As shown in FIG. 1C, the flow path between the power generator and the hole/tunnel can be provided with one or more valves for determining the flow direction of water. Similarly, the flow path between the water storage tank and the hole/tunnel can be provided with one or more valves for determining the flow direction of water.

The power generator can be a liquid turbine generator (e.g., hydro turbine generator) or a gas turbine generator. The water storage tank can be used as a water source to supply water. The water storage tank can also be used as a recovery unit for the water acting on the power generator. That is to say, the water storage tank can have the function of the sink 60 in FIG. 1C. In some embodiments, the water storage tank is a natural facility (e.g., river or lake).

In some embodiments, the shelter having the shelter space contains a metal layer. In some embodiments, the shelter having the shelter space is further surrounded/encapsulated by metal, concrete (e.g., ferro-cement), or a combination thereof, which provides advantages of greater structural stability.

Figure 3:
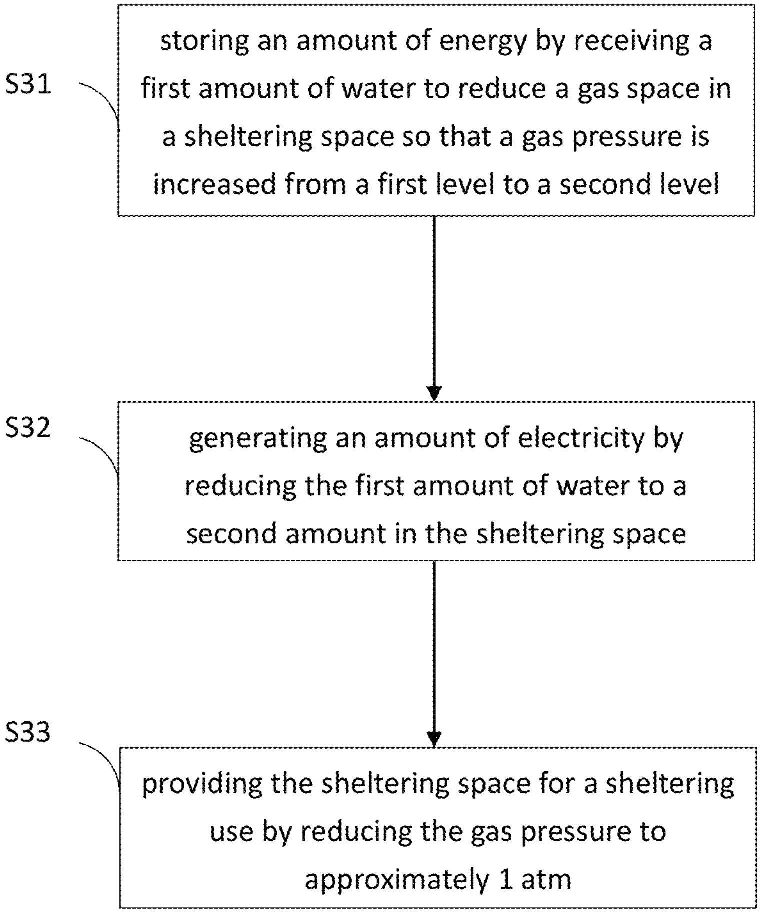
FIG. 3 is a flow chart schematically illustrating the energy storage method in accordance with some embodiments.

FIG. 3 is a flow chart schematically illustrating the energy storage method in accordance with some embodiments. In FIG. 2, the method starts at Step S31. At Step 31, the method include storing an amount of energy by receiving a first amount of water to reduce a gas space in a sheltering space so that a gas pressure is increased from a first level to a second level. The first level of the gas pressure can be a default pressure. The default pressure can be higher than 2 atm or higher than 5 atm (e.g., 6 atm, 7 atm, 8 atm, or 9 atm).

In some embodiments, a difference of the second level of the gas pressure and the first level of the gas pressure is resulted from the space replacement of the first amount of water. In some embodiments, the method can further include pre-pressurizing the gas space before the storing the amount of energy. In some embodiments, the second level of the gas pressure is between 10-70 atm. The second level of the gas pressure can be higher than 10 atm (e.g., 20 atm, 30 atm, 40 atm, 50 atm, or 60 atm).

At Step S32, the method includes generating an amount of electricity by reducing the first amount of water to a second amount in the sheltering space. Specifically, the reduced amount of water can be used to drive a power generator to generate the amount of electricity.

At Step S33, the method includes providing the sheltering space for a sheltering use by reducing the gas pressure to approximately 1 atm. The sheltering use can comprise providing a condition suitable for human stay.

The present invention has been disclosed in the preferred embodiments above, but those skilled in the art should understand that this embodiment is only used to describe the present invention and should not be construed as limiting the scope of the present invention. It should be noted that all changes and substitutions equivalent to this embodiment should be included in the scope of the present invention. Therefore, the protection scope of the present invention shall be defined by the scope of the patent application.

What is claimed is:

1. A power storage system comprising:
- a sheltering space structured to have a power storage mode, an electricity generating mode, and a sheltering mode;
- when in the power storage mode, the sheltering space receives a first amount of water to increase a gas pressure until the gas pressure is increased to a second level from a first level;
- when in the electricity generating mode, the sheltering space has the first amount of water reduced to generate electricity by reducing the gas pressure from the second level to the third level; and
- when in the sheltering mode, reducing the gas pressure within the sheltering space to approximately 1 atm.

2. The power storage system of claim 1, wherein the first level of the gas pressure is higher than 2 atm.

3. The power storage system of claim 1, wherein the first level of the gas pressure is higher than 5 atm.

4. The power storage system of claim 1, wherein the second level of the gas pressure is higher than 10 atm.

5. The power storage system of claim 1, wherein the second level of the gas pressure is between 10-70 atm.

6. The power storage system of claim 1, wherein the third level of the gas pressure is the same or approximately the same of the first level of the gas pressure.

7. The power storage system of claim 1, wherein the sheltering space has sufficient space to accommodate people when in the sheltering mode.

8. The power storage system of claim 1, wherein the sheltering space has sufficient space to accommodate cars or aircraft when in the sheltering mode.

9. The power storage system of claim 1, wherein the electricity is generated by using a water turbine driven by the water.

10. A power supply system comprising:
- a water source for supplying a first amount of water;
- a sheltering space for receiving the first amount of water and for discharging a second amount of water, wherein the sheltering space is provided for a sheltering use by reducing the gas pressure to approximately 1 atm; and
- a power generator for receiving the second amount of water to generate electricity.

11. The power supply system of claim 10, wherein the water source is selected from a river or a lake.

12. The power supply system of claim 10, wherein a shelter for providing the sheltering space is selected from an air-raid shelter, mine, cave, tunnel, above-ground pipeline, underground pipeline, water pipeline, oil pipeline, subway passage, cellar, basement, or railroad arch.

13. The power supply system of claim 10, further comprising a tank recovering water passing through the power generator.

14. The power supply system of claim 13, wherein the recovered water is guided to the water source.

15. The power supply system of claim 13, wherein the sheltering space contains air and the air is compressed by the first amount of water to store energy.

16. A power storage system comprising:
- a sheltering space structured to have a power storage mode, an electricity generating mode, and a sheltering mode;
- when in the power storage mode, storing an amount of energy by receiving a first amount of water to reduce a gas space in a sheltering space so that a gas pressure is increased from a first level to a second level;
- when in the electricity generating mode, generating an amount of electricity by reducing the first amount of water to a second amount in the sheltering space; and
- when in the sheltering mode, providing the sheltering space for a sheltering use by reducing the gas pressure to approximately 1 atm.

17. The power storage system of claim 16, wherein the first level of the gas pressure is higher than 2 atm.

18. The power storage system of claim 16, wherein the first level of the gas pressure is higher than 5 atm.

19. The power storage system of claim 16, wherein the second level of the gas pressure is higher than 10 atm.

20. The power storage system of claim 16, wherein the second level of the gas pressure is between 10-70 atm.

21. The power storage system of claim 16, wherein the third level of the gas pressure is the same or approximately the same of the first level of the gas pressure.

22. The power storage system of claim 16, wherein the sheltering space has sufficient space to accommodate people when in the sheltering mode.

23. The power storage system of claim 16, wherein the sheltering space has sufficient space to accommodate cars or aircraft when in the sheltering mode.

24. The power storage system of claim 16, wherein the electricity is generated by using a water turbine driven by the water.

25. The power storage system of claim 16, wherein a difference of the second level of the gas pressure and the first level of the gas pressure is resulted from the space replacement of the first amount of water.

26. The power storage system of claim 16, wherein the first level of the gas pressure is a default pressure.

27. The power storage system of claim 16, wherein the gas space is pre-pressurized before the storing the amount of energy.

28. The power storage system of claim 16, wherein the sheltering use comprises providing a condition suitable for human stay.

* * * * *